Dec. 4, 1956  J. P. RICH ET AL  2,772,864
METHOD AND APPARATUS FOR EVACUATING PULP
FROM HIGH DENSITY STORAGE TOWERS
Filed Dec. 8, 1954  3 Sheets-Sheet 1
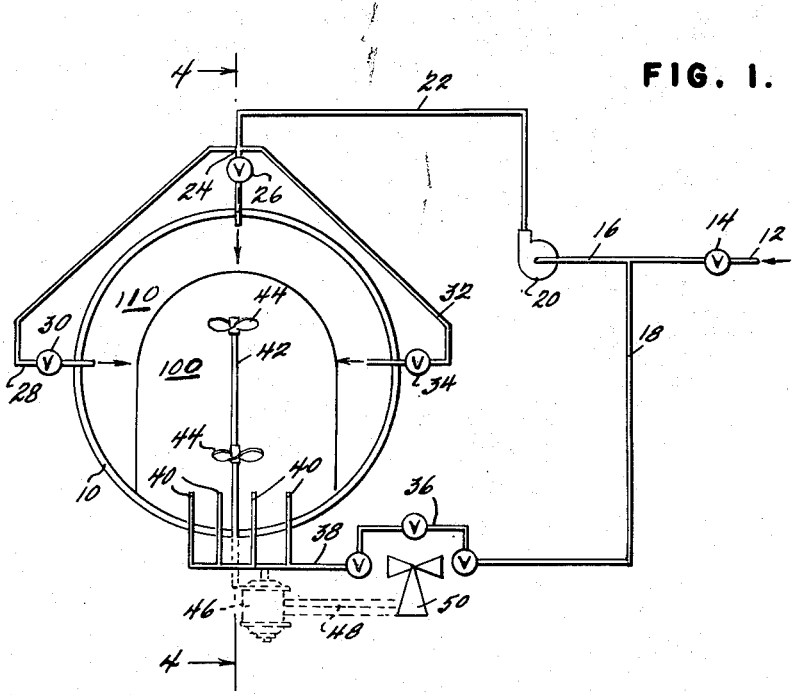
FIG. 1.
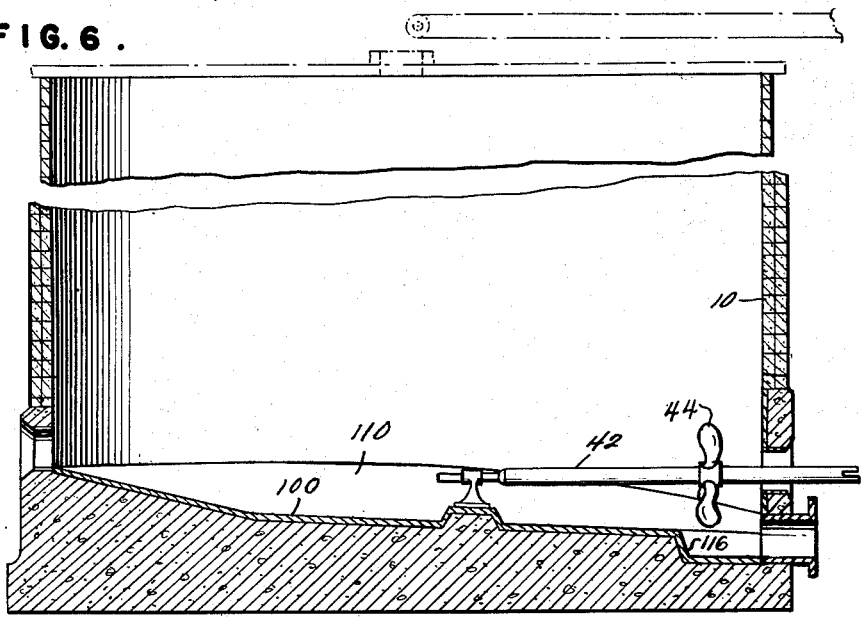
FIG. 6.
INVENTORS
JOHN P. RICH
ARTHUR L. WHITESIDE
BY 
ATTORNEY Dec. 4, 1956   J. P. RICH ET AL   2,772,864
METHOD AND APPARATUS FOR EVACUATING PULP
FROM HIGH DENSITY STORAGE TOWERS
Filed Dec. 8, 1954   3 Sheets-Sheet 2

INVENTORS
JOHN P. RICH
ARTHUR L. WHITESIDE
BY
ATTORNEY

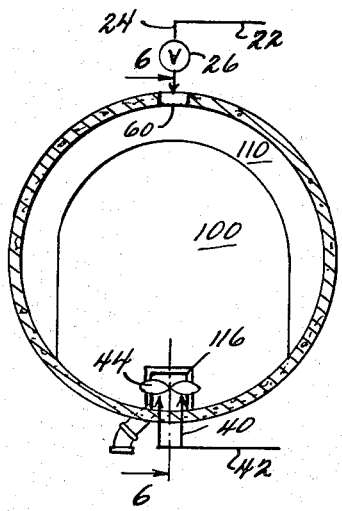
FIG. 3.
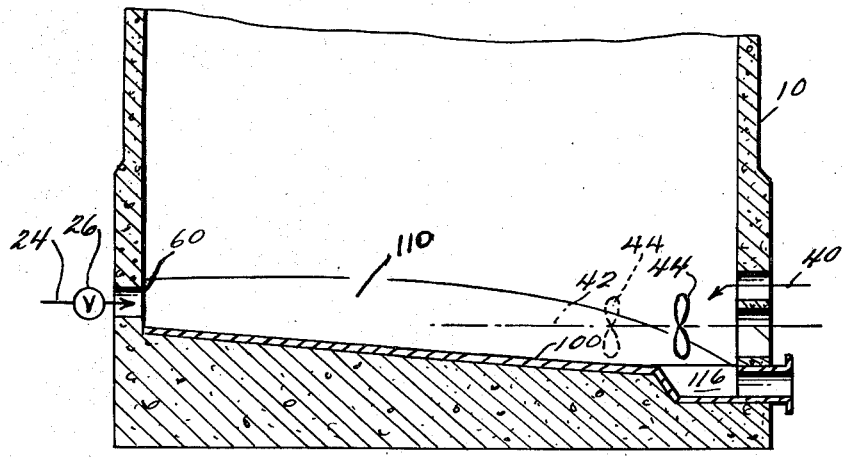
FIG. 4.
FIG. 5.
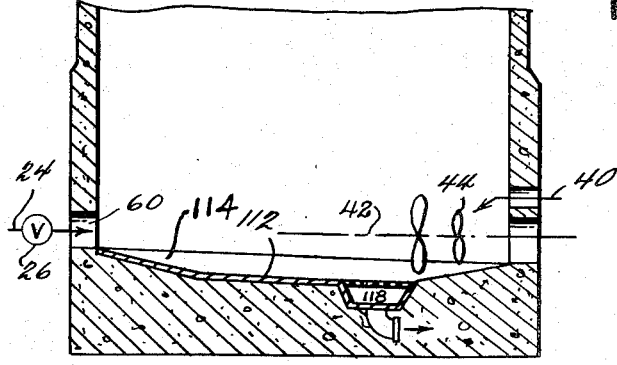
INVENTORS.
JOHN P. RICH
BY ARTHUR L. WHITESIDE
ATTORNEY United States Patent Office 2,772,864
Patented Dec. 4, 1956

2,772,864
METHOD AND APPARATUS FOR EVACUATING PULP FROM HIGH DENSITY STORAGE TOWERS

John P. Rich and Arthur L. Whiteside, Nashua, N. H.

Application December 8, 1954, Serial No. 473,982

3 Claims. (Cl. 259—37)

It is an object of this invention to provide in a high density pulp storage tower a method and means for withdrawing pulp from the bottom of such a tower at a predetermined low, uniform consistency.

It is a further object of this invention to provide a method and means as aforesaid, such that the bottom of the tower may be substantially flat and substantially normal to the axis of the tower whereby to increase capacity for any given overall dimensions.

It is a further object of this invention to provide a method and means for penetrating, saturating and defibering high consistency stock uniformly at a shallow depth over the entire base of a storage tower preparatory to final dilution, blending and withdrawal.

It is a further object of this invention to provide a method and means for blending the saturated, disintegrated, diluted stock to a uniform distribution of fiber in fluid before withdrawal from the tower.

The above and other objects will be made clear from the following detailed descriptions taken in connection with the annexed drawings, in which:

Figure 1 is a schematic plan view showing the arrangement of high and low pressure piping, dilution connections and agitators for a large storage tower.

Figure 3 is a schematic plan similar to Figure 1 for a small storage tower.

Figure 4 is a vertical section in partial perspective taken on the line 4—4 of Figure 1.

Figure 5 is a view similar to Figure 4 but taken on the line 5—5 of Figure 2.

Figure 6 is a view similar to 4 but taken on the line 6—6 of Figure 3.

Figure 2:
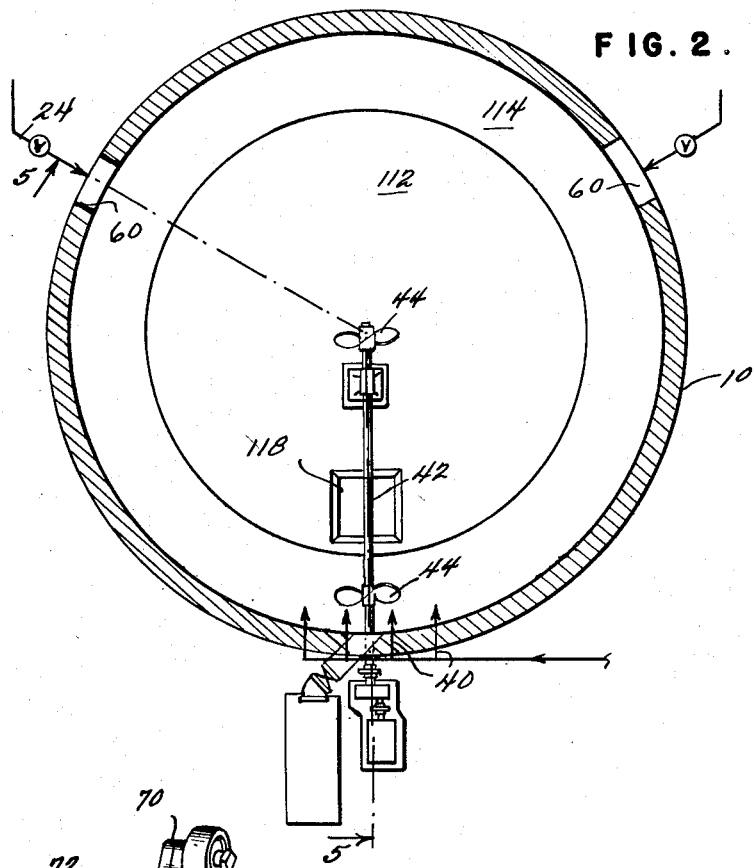
Figure 2 is a schematic plan similar to Figure 1 for an intermediate size tower, and showing a central stock outlet.

The paper forming machine operates continuously, while the digestion of the pulp is essentially a batch process. Between the digestion and the paper machine the pulp is subjected to a variety of treatments, such as washing, screening, bleaching, etc. Any or all of these units must occasionally shut down for any of a variety of reasons. In order that a shut down of one unit shall not enforce a shut down of all units, it increasingly is becoming the practice to provide pulp storage towers intermediate various treatment phases. The capacity of any tower in terms of pulp depends directly on the consistency, that is the percent of solids of the pulp stored. High consistency stock discharge is a function of many mill process units, for which reason in most instances, no additional stock thickening equipment is required in order to serve a storage tower.

While theoretically the density should be as high as possible for maximum capacity, stock at higher than 20% has a marked felting quality and must be shredded before storage, if later uniform dilution and re-pulping is to be assured. As a matter of fact, the region of 16% appears to be optimum for storage purposes. At such consistency the stock is most compact in terms of pounds of dry fiber per cubic foot of volume. Such a consistency is easily attained with conventional vacuum, deckers, thickeners and washers.

The desired low consistency discharge from high density storage varies from 2% to 4½% for most mill processes.

Above 7 or 8 percent consistency a mixture of pulp and water tends to behave like a solid, that is when contained in a cylindrical tower the lateral pressure of the stock against the wall at any point, is not equal to the vertical head of stock at that point. Below 7 or 8 percent consistency such a mixture behaves like a liquid and its lateral pressures and movements respond closely to the ordinary laws of hydraulics. Because lateral flow of high density stock under hydrostatic pressure cannot be counted on, it heretofore has been considered necessary to provide high consistency storage towers with steeply pitched conical bottoms tapering to an outlet at or adjacent which dilution occurs. This was done to ensure that the stock move out of the tower in the same sequence in which it entered. This sequential discharge, while of great importance, in cases where a chemical reaction such as bleaching is taking place in the tower, is not at all critical for the purpose of mere inert storage. Pulp may remain for several weeks in storage without deterioration, therefore the precise sequence of discharge is unimportant and it is only necessary to ensure that ultimately all of the pulp goes through. The conical bottom represents a considerable waste of space, since the volume of any cone is only one third that of a cylinder of the same base and altitude.

The present invention contemplates the provision, in a high density storage tower, of a substantially flat bottom, pitched toward the outlet only enough to facilitate an occasional washup. Adjacent the bottom high pressure, oscillating jets are provided to sweep substantially the entire cross section of the tower. These jets perform several functions. First, they act in a manner analogous to hydraulic mining jets to establish a line of cleavage across the high density stock; second, they perform a diluting function, bringing the consistency down to where the mixture of pulp and water takes on the characteristics of liquid rather than solid behavior; third, they of course perform a considerable mixing function.

It is essential that the direction of the high velocity jets continually be varied. A stationary jet would simply excavate a channel and thereafter remain ineffective. The precise direction of the jet is not critical nor is it critical about what particular axis it may be oscillated. The jet direction and axis oscillation illustrated herein are deemed optimum but are not critical.

Quite possibly the entire diluting and mixing job could be done by the oscillating jets alone. This, however, would require that the entire quantity of dilution water be supplied under pressure of at least one hundred p. s. i., which is far above any ordinary line pressure and therefore would involve considerable pumping cost. The present invention takes advantage of the fact that 6 or 7 percent consistency, uniform dilution becomes a simple matter in the presence of mechanical agitation. A propeller is used as an agitator and the bulk of the dilution water is delivered to the suction side of the agitator under normal line pressure of about 40 p. s. i. The agitator acts on the pulp diluted by the oscillating jets to form a thoroughly uniform pulp slurry, which is then withdrawn through the outlet. Under these conditions, the column of high consistency pulp acts as a piston, pressing down on a shallow layer of dilute stock at the bottom and contributing a considerable hydrostatic head, acting to assist the discharge of dilute stock.

Referring now to Figures 1 and 4, there is shown the shell 10 of a storage tower. A pipe line 12, under the control of a general shut-off valve 14, delivers water at a normal line pressure of 40 to 50 p. s. i. The line 12 divides into branches 16 and 18 with the branch 16 going to a booster pump 20. The booster pump 20 delivers to a line 22 at about 100 p. s. i. The line 22 divides into a branch 24 controlled by a valve 26, a branch 28 controlled by a valve 30 and a branch 32 controlled by a valve 34. Each of the branches 24, 28, and 32 penetrate the shell 10 and deliver water to the interior through nozzles 60 hereinafter described.

The other branch 18 of the line 12 delivers to a valve system 36 thence to a header 38 from which one or more lines 40 penetrate the shell 10.

A shaft 42 penetrates the shell 10 through a suitable stuffing box and has secured thereto one or more propellers 44. The center lines of pipes 24, 28 and 32 lie substantially in the center line of the shaft 42 while the center lines of the pipes 40 lie a short distance (12 to 24 inches) above the center line of the shaft 42.

The shaft 42 is driven by a motor 46 which has electrical connection through lines 48 to a regulator 50 which controls the valve system 36. It has been found that the load on the motor 46 is quite closely proportional to the consistency of the stock surrounding the propellers 44. Since it is electrically simple to measure the load on a motor it is equally simple to make a valve system responsive to such load. Because the instrumental elements are conventional and easily procured on the open market, it is not deemed necessary to describe these in detail.

Figure 7:
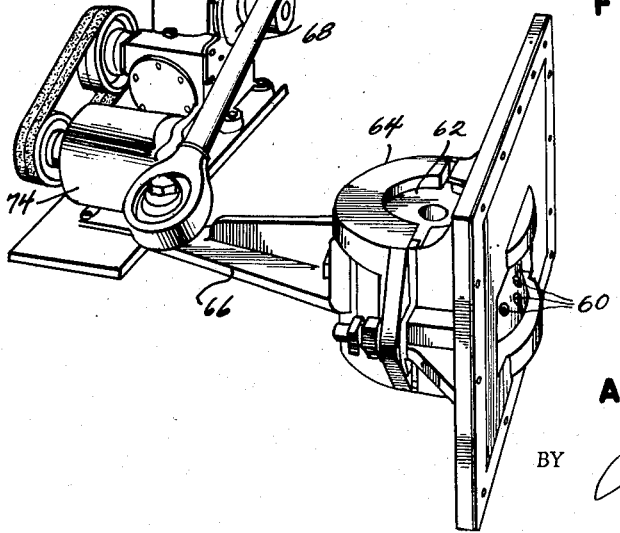
Figure 7 is a perspective view illustrating a preferred form of power driven hydraulic mining nozzle.

The nozzles 60 are the same in all the various installations illustrated and the details are shown in Figure 7. Any of the pipes such as 24, 28 or 32 of Figure 1, pass through an axle 62 mounted in a bearing 64. The axle 62 has a lever arm 66 which is connected by a link 68 to a crank 70 which is driven through suitable gearing 72 by a motor 74. The lever 66 oscillates through a total angle of 60 degrees, while the outlets of the nozzle 60 diverge through a total angle of 110 degrees. The divergence of the nozzles and their oscillation combine to provide a total coverage by each unit of 170 degrees. These nozzles, operating under 100 p. s. i. or more, function in the manner of a jet mining operation to bring about a line of cleavage between the solid acting column of high density stock and a shallow layer of fluid acting low density stock. The lines 40 deliver dilution water into the suction area of a propeller type agitator 44. The particular design of agitator is not critical, except that it should be such as to set up an area of circulation. While two impellers 44 are shown in Figure 1, for most purposes a single impeller will suffice and this should be placed so that its suction blankets the outlet 116. By thus providing an area of agitation and circulation directed away from the outlet 116, it is rendered certain that only well mixed, fully diluted pulp can flow across the bottom 100 to the outlet 116. The bottom 100 is a plain, slightly sloping surface, surrounded by what amounts to a conical fillet 110.

Figures 2 and 5 show an arrangement suitable for a tower of lesser diameter than that of Figures 1 and 4. Here the bottom is made up of a central section 112, sloping toward a more or less centrally located outlet 118, surrounded by a conical fillet 114. Only two sets of nozzles 60 are provided and one or more impellers 44 are located to accept dilution water from lines 40 and to have either the suction or discharge side blanket the outlet 118.

Figures 3 and 6 show an arrangement suitable for a still smaller tower. Here only one set of oscillating nozzles 60 is provided and this is located diametrically across from the impeller 44 and the dilution lines 40. The design of the bottom is substantially the same as in Figures 1 and 4.

It has been found that with the arrangements above described, the total water input to the oscillating nozzles may be kept at a minimum and requires relatively little adjustment for a wide range of discharge rates. For example, assuming storage at 14 percent consistency and discharge at 3 percent, the total water requirements are 435 gallons per minute for a discharge rate of 100 tons per day or 870 gallons per minute for a discharge rate of 200 tons per day. For successful operation the high pressure lines need supply only 160 gallons per minute for the 100 ton per day rate and only 200 gallons per minute for the 200 tons per day rate. It is evident therefor that the delivery of water to the high pressure nozzles increases only 25 percent, while the pump rate is doubled. At the 100 ton per day pump out rate, the high pressure water amounts to 36.8 percent of the total dilution, while at the 200 ton per day rate high pressure water amounts to only 23 percent of the total dilution. In any case far less than half the dilution water is supplied at high pressure.

While various arrangements have been described and illustrated, these are susceptible of considerable variation without departure from the principles herein disclosed. This invention is not therefor to be limited to the details herein disclosed but only as set forth in the sub-joined claims.

We claim:

1. In a pulp storage tower, a substantially flat bottom having an outlet formed therein; a plurality of high pressure nozzles penetrating said tower and directed inwardly adjacent said bottom; means for oscillating said nozzles about an axis substantially parallel to the axis of the tower; means for agitating and circulating pulp adjacent said bottom, said means having a suction side and a discharge side; and low pressure nozzles penetrating said tower and directed inwardly toward the suction side of said means.

2. A pulp storage tower as set forth in claim 1 in which the outlet underlies and is adjacent to the means for agitating and circulating.

3. A process of unloading a mass of pulp stored at non-fluid consistence in a tower having a substantially flat floor, said floor having an outlet formed therein, said process comprising: applying high velocity jets of dilution fluid adjacent said floor to shear off portions of said mass of pulp; continuously changing the direction of said jets to afford uniform treatment over a maximum area and to initiate dilution and defibering of the sheared off portions; circulating the dilute pulp along a path generally parallel to said floor, said path in part, at least, overlying said outlet, and delivering into said path additional dilution fluid, sufficient, when added to the fluid supplied by said jets, to reduce the consistence to a pumpable slurry for passage through said outlet.

References Cited in the file of this patent

UNITED STATES PATENTS

| | | |
|---|---|---|
| 1,311,827 | McDole | July 29, 1919 |
| 1,616,547 | Pontoppidan | Feb. 8, 1927 |
| 1,692,112 | Cram | Nov. 20, 1928 |
| 2,089,992 | Campbell et al. | Aug. 17, 1937 |
| 2,125,913 | Goebels | Aug. 9, 1938 |
| 2,534,324 | Von Hildebrandt | Dec. 19, 1950 |
| 2,696,766 | Stark | Dec. 14, 1954 |